(12) United States Patent
Cunningham

(10) Patent No.: US 8,383,222 B2
(45) Date of Patent: Feb. 26, 2013

(54) SELF-LAMINATING CARD AND ASSEMBLY

(75) Inventor: Dennis W. Cunningham, Gilberts, IL (US)

(73) Assignee: Xertrex International, Inc., Itasca, IL (US)

( * ) Notice: Subject to any disclaimer, the term of this patent is extended or adjusted under 35 U.S.C. 154(b) by 289 days.

(21) Appl. No.: 12/764,776

(22) Filed: Apr. 21, 2010

(65) Prior Publication Data
US 2011/0262674 A1    Oct. 27, 2011

(51) Int. Cl.
*B32B 9/00* (2006.01)
*B32B 33/00* (2006.01)
*G09F 3/10* (2006.01)

(52) U.S. Cl. ............ 428/40.1; 428/41.7; 428/42.1; 428/42.2; 428/42.3; 40/625; 40/626; 40/630; 40/672

(58) Field of Classification Search .......... 428/40.1, 428/41.7, 42.1–43; 283/72, 81, 100, 101, 283/106; 40/625, 626, 628, 630, 672
See application file for complete search history.

(56) References Cited

U.S. PATENT DOCUMENTS

| | | | | |
|---|---|---|---|---|
| 2,979,840 | A | * | 4/1961 | Eastman ............... 40/638 |
| 3,582,439 | A | * | 6/1971 | Thomas ............... 235/488 |
| 3,854,229 | A | | 12/1974 | Morgan |
| 4,986,868 | A | | 1/1991 | Schmidt |
| 5,172,938 | A | | 12/1992 | Schmidt |
| 5,173,080 | A | | 12/1992 | Longtin |
| 5,283,093 | A | | 2/1994 | All |
| 5,318,326 | A | | 6/1994 | Garrison |
| 5,518,787 | A | | 5/1996 | Konkol |
| 5,658,016 | A | | 8/1997 | Goeken |
| 5,837,337 | A | | 11/1998 | Schnitzer |
| 5,840,143 | A | | 11/1998 | Swanson |
| 6,517,921 | B2 | | 2/2003 | Ulrich et al. |
| 7,005,170 | B1 | | 2/2006 | Simpson et al. |

* cited by examiner

*Primary Examiner* — Patricia Nordmeyer
(74) *Attorney, Agent, or Firm* — James B. Conte; Husch Blackwell LLP

(57) ABSTRACT

A self-laminating assembly for providing information, such as emergency medical or contact information, or a temporary identification card, for general purposes. Medical data or contact information is entered on a card which is predisposed within the assembly. The card can then be covered with a transparent plastic sheet and folded in half, along a perforation in its center to permanently seal the card within the transparent plastic enclosure.

15 Claims, 9 Drawing Sheets

MED CARD

MEDICATION  DATE  DOSE  FREQUENCY

I ALSO TAKE:
☐ OVER THE COUNTER  ☐ INHALERS
☐ HERBALS  ☐ EYE DROPS
☐ VITAMINS  ☐ SUPPLEMENTS
NAME _____  DOB _____
EMERGENCY
TEL # _____ EMERGENCY TEL # _____
DOCTOR (Primary) _____
TEL # _____ CITY _____

FIG. 8A

ALERTS

☐ ADVANCE DIRECTIVE  ☐ PACEMAKER
☐ ASTHMA  ☐ PREMEDICATE
☐ DIABETIC  ☐ STROKE PATIENT
☐ HEARING IMPAIRED  ☐ OTHER _____
☐ HEART CONDITION
☐ IMPLANTS  ☐ OTHER _____
☐ NO EPINEPHRINE
☐ ON ANTICOAGULANTS

ICE MEDICAL ALERT CARD
(In Case of Emergency)

NAME _____ TEL # _____
DR. NAME _____ TEL # _____
PHARMACY _____ TEL # _____
ALLERGIC TO:
☐ PENICILIN
☐ CODEINE
☐ SULFA
☐☐☐☐

FIG. 8B

SELF-LAMINATING CARD AND ASSEMBLY

FIELD OF THE INVENTION

The present invention relates generally to an assembly for producing a laminated card, and more particularly to an invention which allows a user to record pertinent information onto a provided card, which can then be folded over to provide a front and rear side and then be instantly laminated. The invention is applicable, for example, for providing emergency medical information or quick reference contact information on a laminated card.

BACKGROUND OF THE INVENTION

This invention relates to a self-laminating, two-sided card which provides important information about its user. The assembly disclosed and claimed herein has particular, although not exclusive, application to providing information relating to critical health, medical and emergency contact information, or a temporary identification card, for general purposes.

In a situation where a patient is unconscious or otherwise unable to communicate, a card with the patient's emergency medical information can prove valuable. If a patient is unconscious, an emergency responder may look for any items on a patient which would disclose medical information. Therefore, having a laminated card which can always be carried by a person in their wallet or purse can prove useful in emergency situations.

If the information contained on the card were smudged or otherwise inadvertently altered the card would be less useful. Therefore, it is advantageous to have this information protected within a transparent enclosure, such as plastic film or other web material.

Biddle, U.S. Pat. No. 3,068,140 discloses a method for creating a plastic identification device by typing, writing or otherwise inscribing information onto a base which is then cut and folded in half along a center line. The folded base sheet is then covered with transparent plastic material. Biddle teaches a lamination process which requires fusing a plastic sheet together by applying a combination of heat and pressure.

Goeken, U.S. Pat. No. 5,658,016 teaches an attachment for an identification card providing for example, medical information. However, Goeken discloses a transparent attachment which can only be used with and secured onto a separate, user provided identification card.

Simpson et al., U.S. Pat. No. 7,005,170 teaches an assembly for placing an information sheet or card into an envelope, which is then secured with adhesive to close the envelope. However, the envelope does not create a permanent seal as the invention discloses the option for the envelope to be opened to obtain information on the card.

SUMMARY OF THE INVENTION

Embodiments of the present invention generally provide a self-laminating enclosure with an informational card predisposed within the enclosure, which can then be folded along a perforation in its center. A construction for a card or label is provided within the self-contained unit and components thereof may be quickly utilized to provide a secure repository of information As will be seen below, the invention includes an assembly incorporating components which allows a user to input vital information onto multiple sides of a blank card and then fold the card along a perforation before permanently sealing the card within a transparent plastic film enclosure. This plastic film enclosure sometimes referred to herein as a laminated enclosure, helps eliminate smudging of the written information, and provides a strong, durable and water resistant card.

BRIEF DESCRIPTION OF THE DRAWINGS

FIG. 8A shows front and rear views of the self-laminating card after it has been completely assembled.

FIG. 8B shows front and rear views of another embodiment of the self-laminating card after it has been completely assembled.

DETAILED DESCRIPTION OF THE PREFERRED EMBODIMENT

Figure 1:
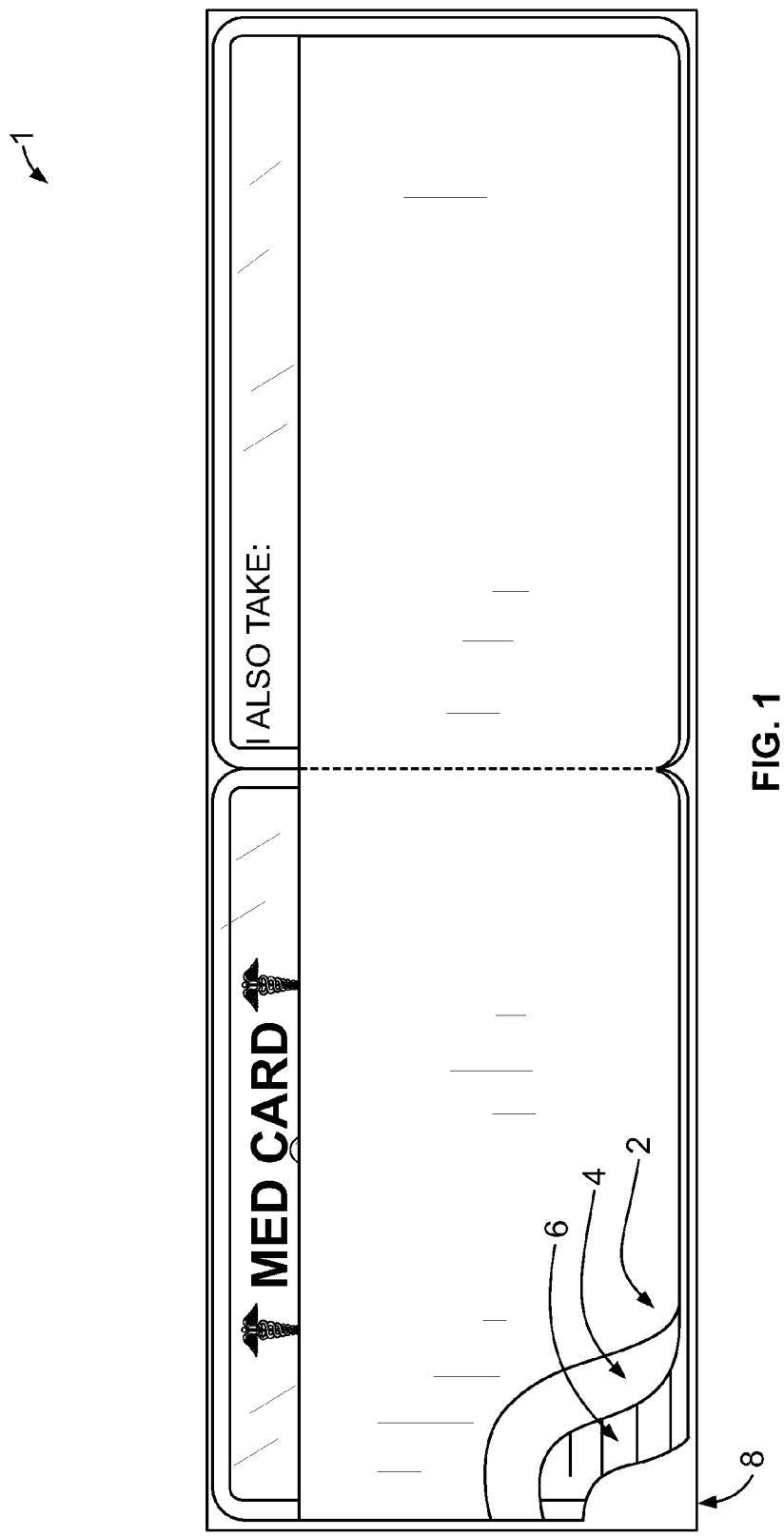
FIG. 1 is a front view of the self-laminating card prior to use.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Figure 2:
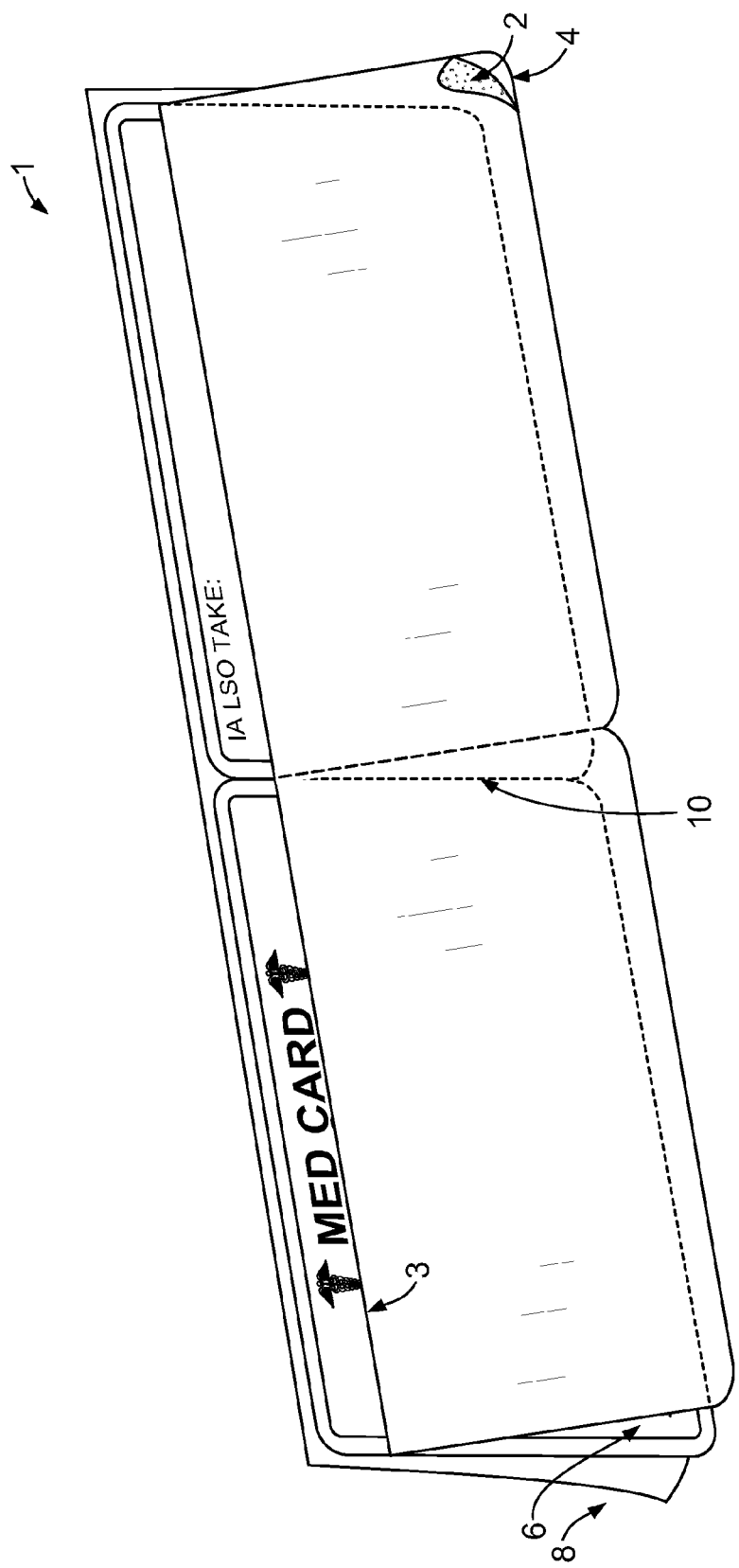
FIG. 2 is a perspective view of the self-laminating card, showing the four distinct layers of the present invention.
Figure 9:
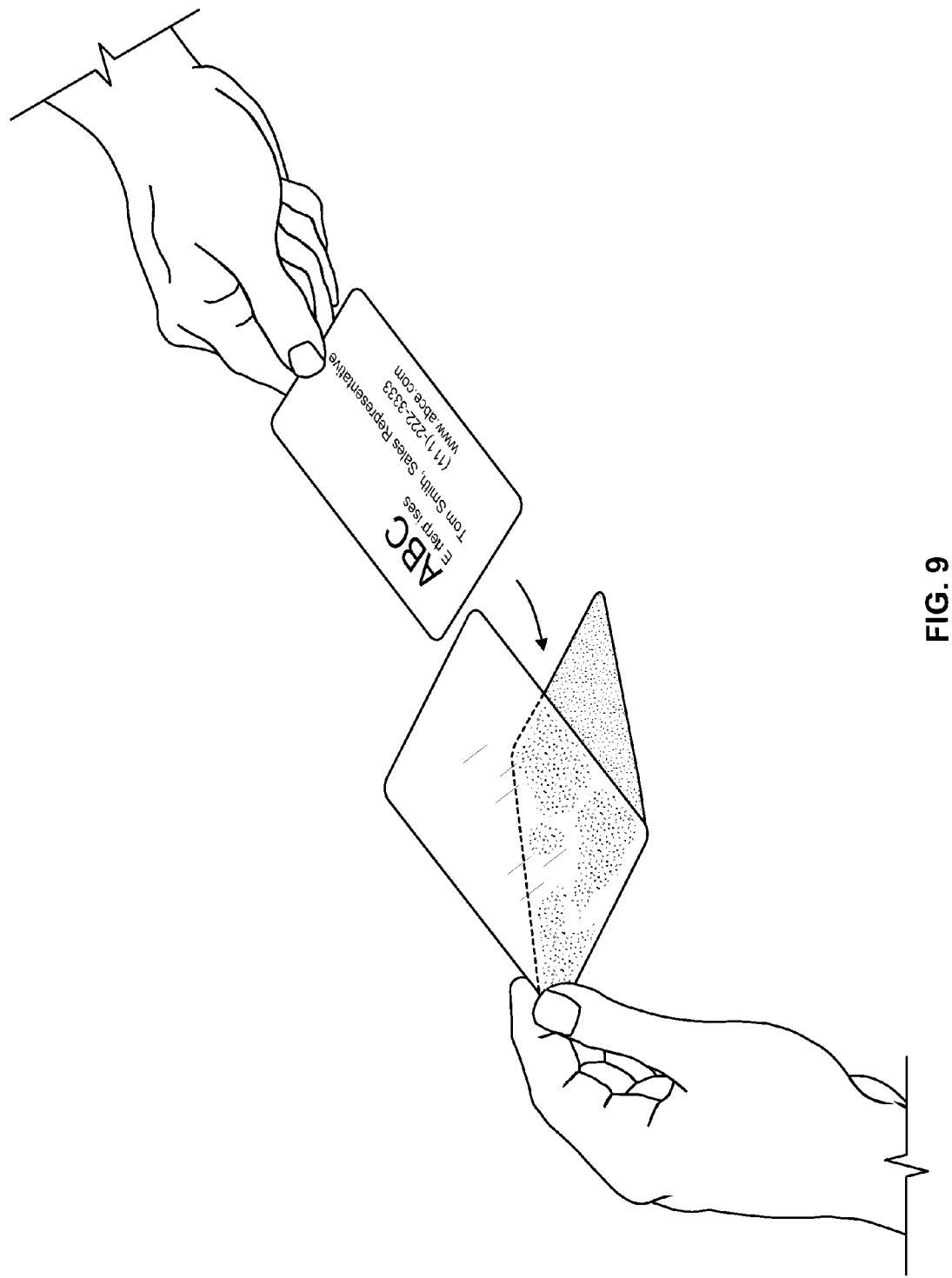
FIG. 9 shows an alternative embodiment of the self-laminating card when used with a business card.

Referring now to the drawings, a self-laminating card and assembly construction in accordance with the teachings of the present invention is shown in its entirety and in the condition it is in prior to use in FIGS. 1-2. FIGS. 3-7 show the steps of assembling the self-laminating card and FIGS. 8A and 8B show a completed embodiment of the present invention. FIG. 9 shows an alternate embodiment of the self-laminating card where it can be used to laminate any comparably sized card such as a business card.

FIG. 1 is a front view of one embodiment of the self-laminating card 1. In this embodiment, there are four main layers to the assembly and portions of each layer are shown on FIG. 1. Also, the front and rear sides of the completely assembled laminated card 20 are shown positioned adjacent to each other prior to assembly of the self-laminating card 1.

Figure 3:
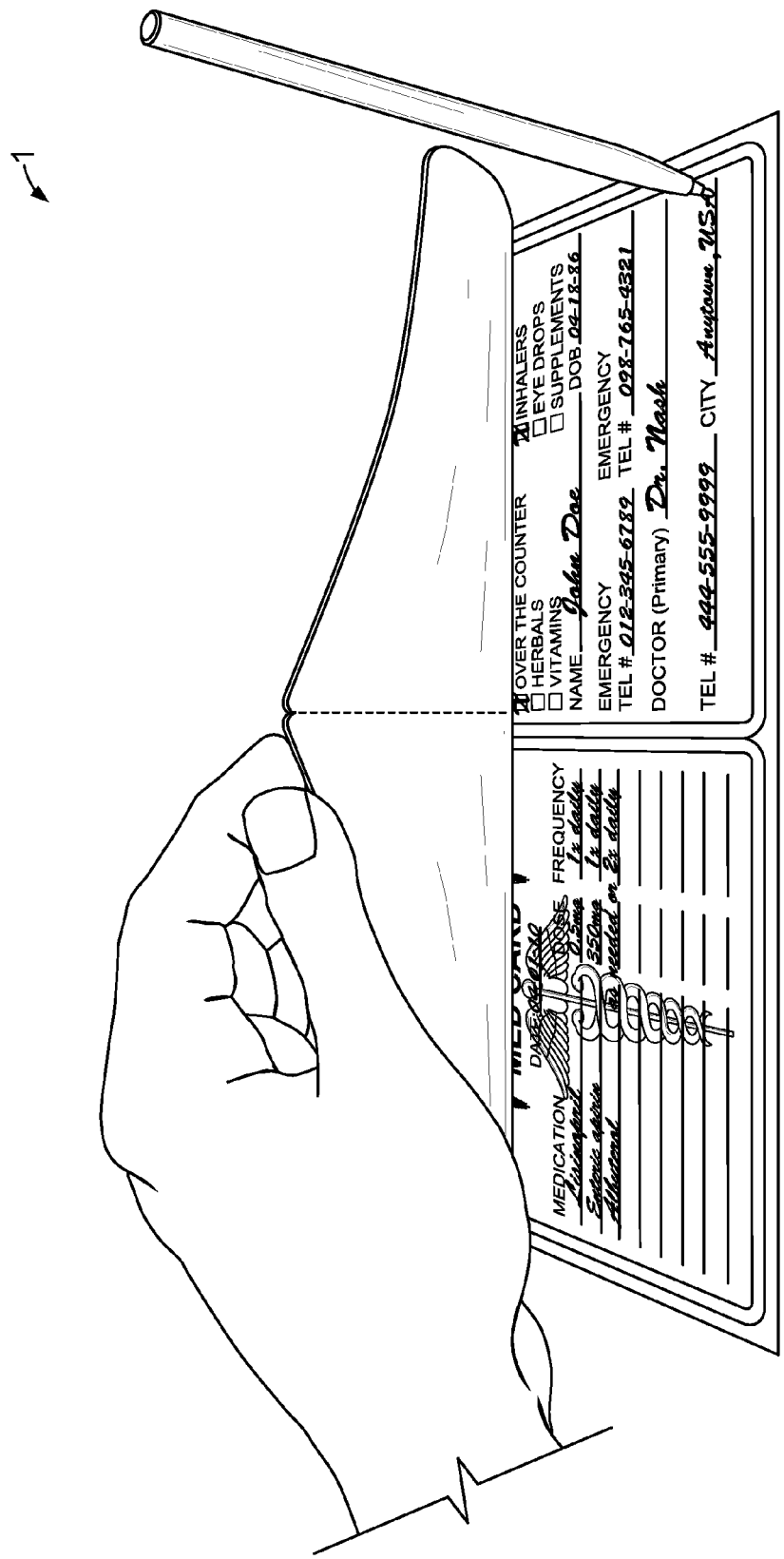
FIG. 3 is a perspective view of the self-laminating card showing the laminate layer being lifted from the card to allow a user to input their information.

The top layer of the self-laminating card 1 is composed of a transparent laminate layer 2. The layer is a plastic web such as a plastic film or sheet. The transparent laminate layer 2 has an opaque-colored backing 4 which is temporarily held in place by adhesive on the inner face of the laminate layer 2. The backing 4, which can also be referred to as laminate release liner 4, forms the second layer of the self-laminating card 1 and allows the transparent laminate layer 2 to be easily separated and lifted from the card layer 6. As shown in FIG. 3, this allows for a user to input information onto the card 6.

The card 6 is provided within the self-laminating card assembly 1 and has a writable surface to allow a user to record their personal information onto the card 6 such as by printing. In one embodiment, check boxes and blank lines are provided on the card 6 to allow a user to quickly and more efficiently enter their pertinent information. In another embodiment, the card 6 can be brightly colored in order to alert an emergency responder to the fact that important information is available on the card 6.

The card 6 also has an adhesive backing which is temporarily held in place by second backing 8 which can also be referred to as a card release liner 8. The card release liner 8 is the fourth and final layer and can be removed to reveal adhesive behind the card 6. The card release liner 8 can be larger than the card 6 to allow for easier removal of the liner 8. Once the card 6 is folded in half, the adhesive attaches the front and rear sides of the card 6 onto themselves in a secure and permanent manner. The card assembly 1 is now completely assembled as a completed card 20 which is now approximately the size of a credit card and laminated on both its front and rear side. Put another way the card has a transparent plastic web, such as a plastic film or sheet, adhesively fixed to the front and rear side of the card.

FIG. 2 is a perspective view of the self-laminating card 1. The transparent laminate layer 2 is attached to the card layer 6 by an adhesive which is applied from the outer edge of the laminate layer 2 to a point which forms the attachment edge 3. The attachment edge 3 is offset from the outer edge of the laminate layer 2, to allow for a sufficient amount of adhesive to connect the two layers to each other. The adhesive which attaches the transparent laminate layer 2 to the card layer 6 may be stronger than the adhesive which attaches the release liners 4, 8 to the laminate layer 2 and card layer 6 respectively. The attachment edge 3 runs the entire length of the self-laminating card 1. Further, there is a perforated line which runs vertically along the center of the laminate layer 2 and card layer 6 which forms a fold center line 10. The fold center line 10 will act as a guide for folding the self-laminating card 1 in half.

Figure 4:
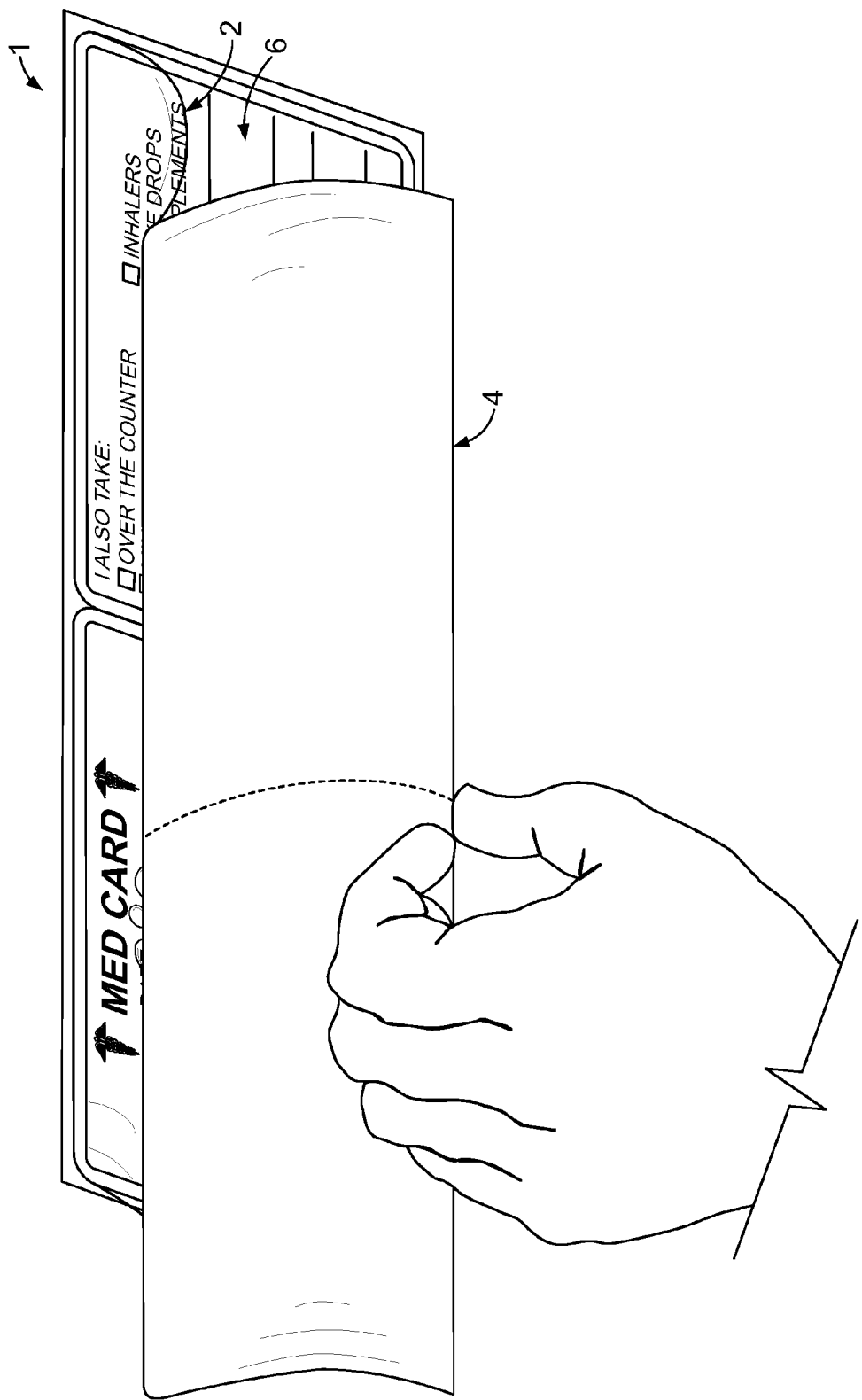
FIG. 4 is a perspective view of the self-laminating card showing the rear backing layer being removed from the front laminate layer.
Figure 5:
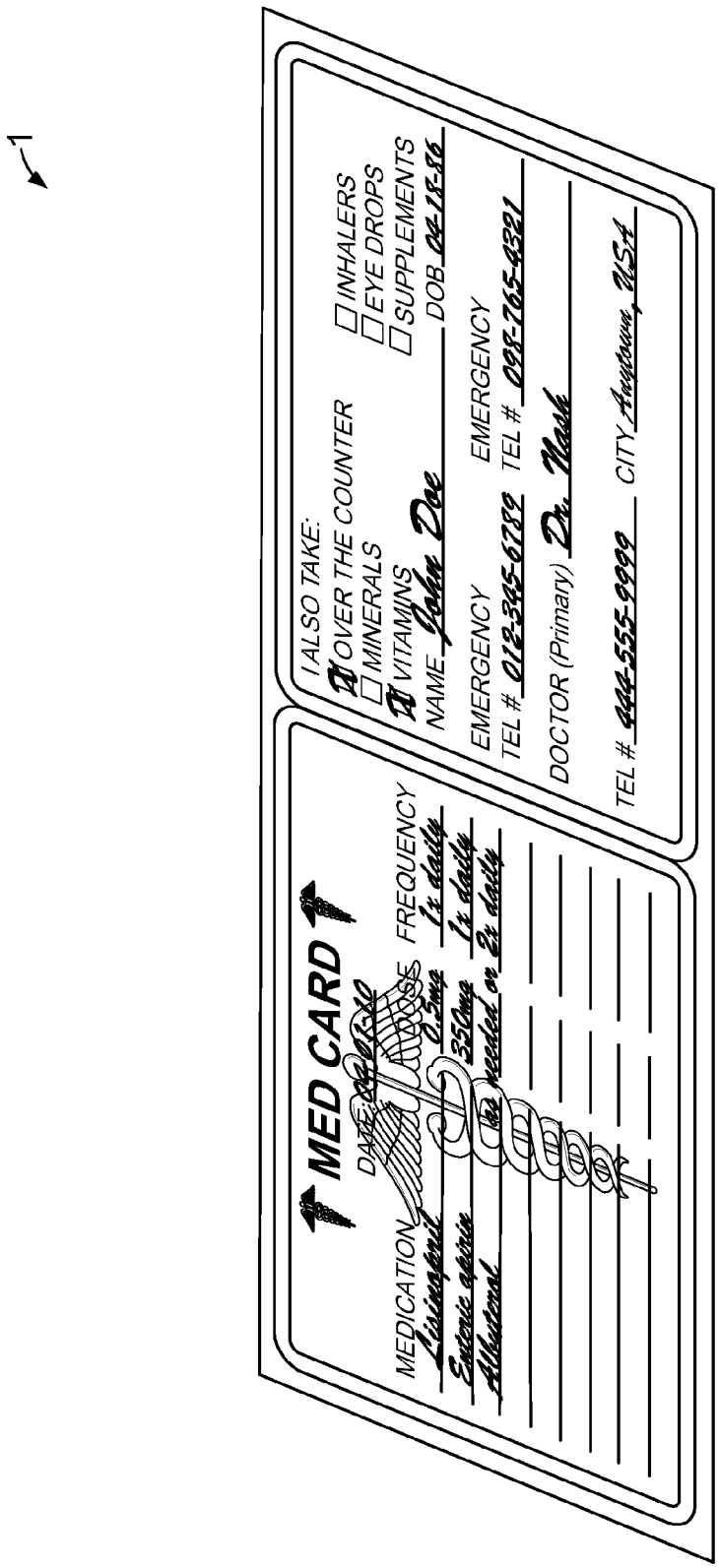
FIG. 5 is a front, perspective view of the self-laminating card and showing the front laminate layer adhesively secured to the information card.

FIG. 4 is a perspective view of the self-laminating card 1 showing the first step in assembling the completed card 20. After the necessary information has been entered onto the card 6, a user can proceed to begin assembling the self-laminating card 1. The first step is to lift and remove the laminate release liner 4 from the inner face of the laminate layer 2, revealing a layer of adhesive. With this adhesive, the laminate layer 2 can now be pressed firmly onto the card 6 to securely and permanently laminate the card 6. FIG. 5 is a perspective view of the self-laminating card 1 with the transparent laminate layer 2 applied to the card 6. Put another way card 6 has a plastic film 2 adhesively fixed thereto which completely covers the card.

Figure 6:
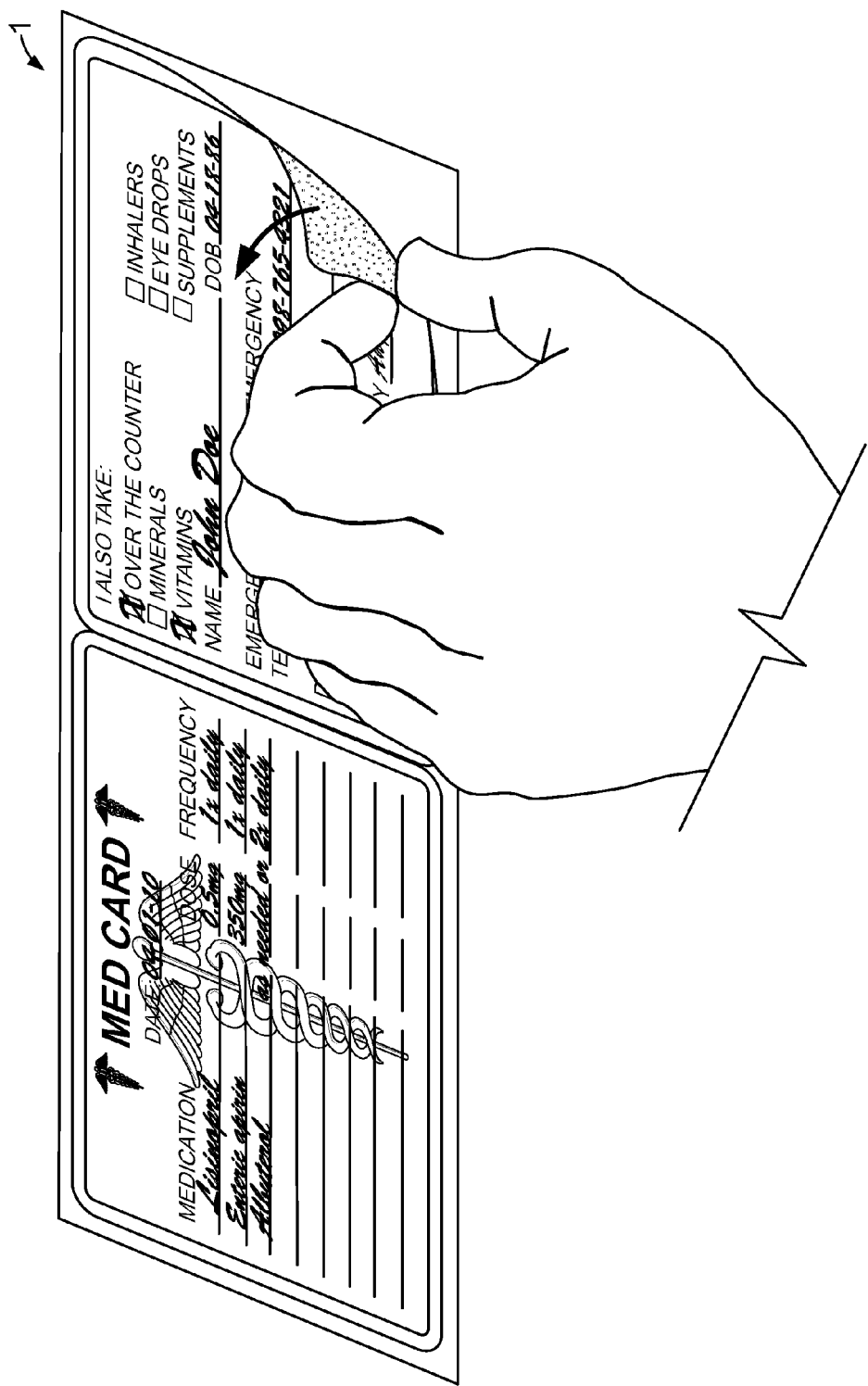
FIG. 6 is a front, perspective view of the self-laminating card showing the card release liner being separated from the laminated information card.

FIG. 6 shows the next step in assembling the self-laminating card 1. After applying the transparent laminate layer 2, the card 6 is now ready to be folded upon itself to create a double-sided card. To accomplish this, the card release liner 8 is separated from the card 6, revealing a layer of adhesive. In an alternate embodiment of the invention, laminate release liner 4 and the card release liner 8 can have printed instructions alerting a user on instructions on how to assemble the self-laminating card 1. For example, these instructions can provide detailed step by step directions on how to assemble the self-laminating card 1 or may just provide an instruction to remove one or both of the release liners.

Figure 7:
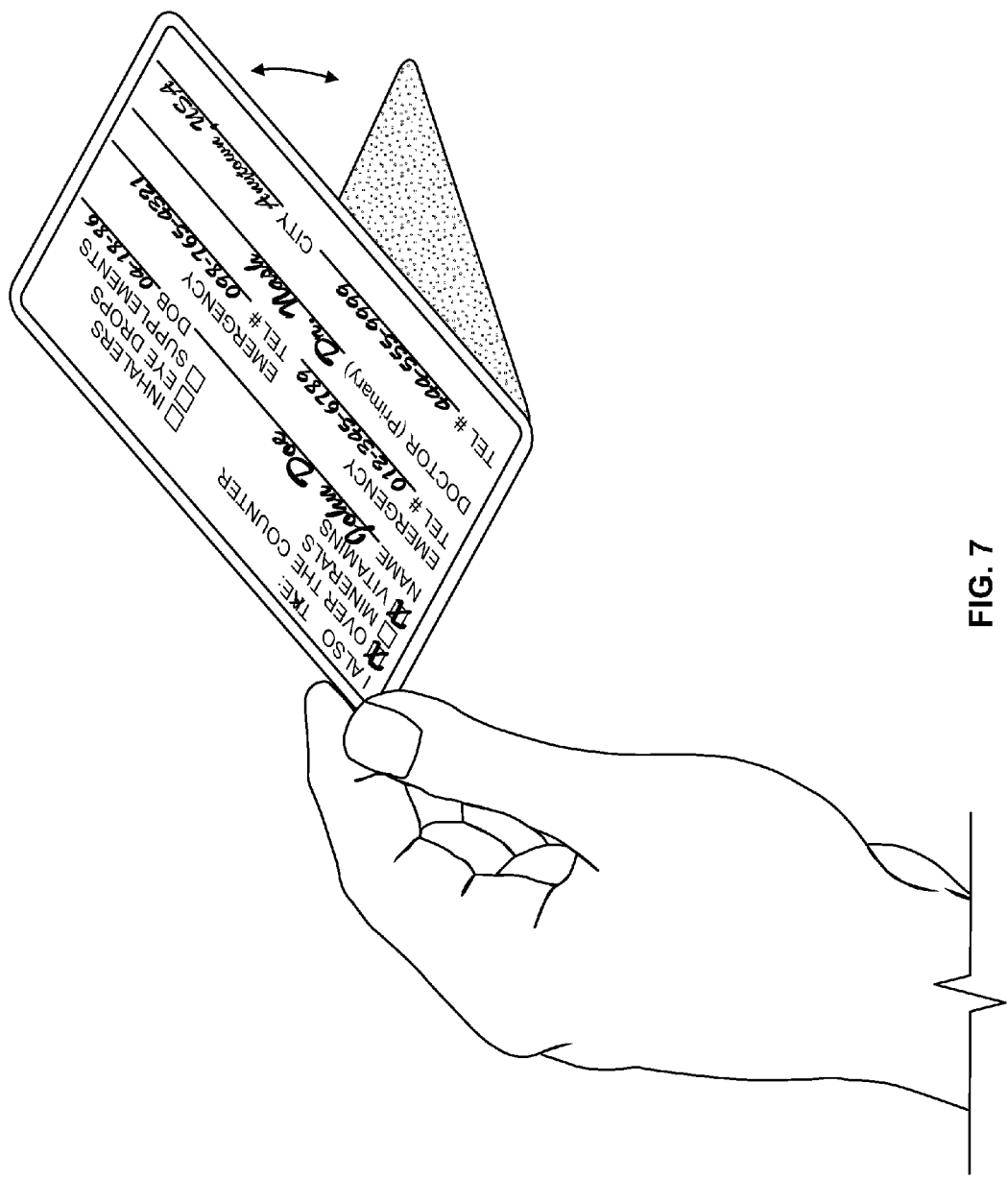
FIG. 7 is a perspective view of the self-laminating card in partial folded condition.

As illustrated in FIG. 7, the card 6 can now be folded in half along a perforated centerline 10 provided in the center of the card 6. With its adhesive backing, the card 6 can be firmly pressed together, permanently joining its two sides. With the card now laminated, i.e., covered in plastic film, the written information is sealed within. The end result is a strong, durable, water resistant card which resists smudging.

FIGS. 8A and 8B illustrate front and rear views of various embodiments of the completely assembled card 20.

FIG. 9 illustrates another use for the invention. FIG. 9 illustrates how the present invention can be used with a business card. However any comparably-sized flat object can be utilized. To be used with a card other than the provided card 6, the card 6 and card release liner 8 are first removed and discarded, leaving only the transparent laminate layer 2 and laminate release liner 4. The assembly could of course be manufactured without card 6 and release liner 8. As before, the laminate release liner 4 is removed from the inner face of the laminate layer 2, revealing a layer of adhesive. The laminate layer 2 can now be applied to both the front and rear of the business card. This alternate use of the present invention allows a user to instantly and permanently laminate any card, thereby adding to the overall flexibility of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

I claim:

1. A card assembly comprising:
   a transparent laminate layer with a first adhesive backing and a laminate release liner that releasably adheres to an inner face of said transparent laminate layer;
   a card having a front and rear side when the card is in a folded position, said card having an inner face opposite said front and rear side;
   a second adhesive backing on said inner face of said card;
   a card release liner releasably adhered to said second adhesive backing;
   and an attachment edge defining a boundary of an area wherein a portion of the transparent laminate layer is directly adhered by said first adhesive backing to a portion of said front side and said rear side of said card, said attachment edge running a length of the card.

2. The card assembly of claim 1 wherein the front and rear sides of the card are positioned adjacent to each other prior to assembly.

3. The card assembly of claim 1 wherein both the transparent laminate layer and card have a perforated line through the center of the laminate layer and card defining a fold line.

4. The card assembly of claim 1 wherein the laminate release liner and card release liner are opaque.

5. The card assembly of claim 4 wherein the card is preprinted with check boxes and blank lines on the surface of the card.

6. The card assembly of claim 1 wherein one of said front side and said back side of said card has a writable surface.

7. The card assembly of claim 1 wherein the laminate release liner has a larger area than the card.

8. The card assembly of claim 1 wherein the laminate release liner and card release liner have matter thereon, informing a user of assembly instructions.

9. The card assembly of claim 1 wherein the card is made of a brightly colored background.

10. The card assembly of claim wherein said transparent laminate is permanently adhered to said front and rear side of said card by said attachment edge.

11. A card assembly comprising:
- a transparent laminate layer having an outer face and an inner face, a first adhesive backing on said inner face of said transparent laminate layer, and a laminate release liner releasably adhered to a lower portion of said first adhesive backing on said inner face of said transparent laminate layer;
- a card having an outer face and an inner face, wherein said outer face of said card includes a front and rear side when the card is in a folded position, and wherein an upper portion of said transparent laminate is adhered to said outer face of said card by said first adhesive backing, wherein an attachment edge defines the transition between said upper portion and said lower portion of said transparent laminate layer;
- a second adhesive backing on said inner face of said card; and
- a card release liner releasably adhered to said second adhesive backing.

12. The card assembly of claim 11 wherein said upper portion of said transparent laminate is permanently adhered to said outer face of said card.

13. The card assembly of claim 11 wherein said card is divided into said front and rear side by a fold line.

14. The card assembly of claim 13 wherein said fold line comprises perforations.

15. The card assembly of claim 11 wherein said attachment edge runs a length of said outer face of said card.

* * * * *